PATENT 3,651,041
Patented Mar. 21, 1972

3,651,041
ACID ION EXCHANGERS DERIVED FROM AGAROSE
Horst D. Schell and Victor F. Ghetie, Bucharest, Rumania, assignors to Institutul de Biochimie, Bucharest, Rumania
No Drawing. Filed Mar. 28, 1969, Ser. No. 811,624
Claims priority, application Rumania, Mar. 30, 1968, 57,502
Int. Cl. C07c 47/18
U.S. Cl. 260—209 R    5 Claims

ABSTRACT OF THE DISCLOSURE

The present invention deals with the synthesis of new strong acid ion exchangers derived from agarose.

The procedure for obtaining the derivatives, according to the invention, consists in the introduction of sulphoethyl groups either into simple agarose molecule or into agarose cross-linked through glyceric bridges by means of epichlorohydrin.

---

The present invention deals with new synthetic derivatives of agarose applicable in ion-exchanging chromatography.

These synthetic derivatives can be used particularly for the investigation, isolation and purification of macromolecular substances such as animal or plant proteins, enzymes, etc.

Similar products are known, however, obtained from cellulose or dextrane and destined for similar purposes.

The present invention extends the range of products which are used in chromatographic analysis by achieving new strong acid ion-exchangers.

The procedure for obtaining the derivatives, according to the invention, consists in the introduction of sulphoethyl groups (SE), $CH_2$—$CH_2$—$SO_3H$, either into simple agarose molecules or into agerose cross-linked through glyceric bridges by means of epichlorohydrin. Such cross-linked agarose is prepared, e.g., according to U.S Pat. 3,507,851.

Two examples of the invention are given as follows:

EXAMPLE 1

10 g. agarose are introduced into 35 ml. of 10 N sodium hydroxide solution chilled down to about 0° C. and homogenized. After one hour, 3 g. of sodium bromoethylsulphonate, $BrCH_2$—$CH_2$—$SO_3Na$, dissolved in 5 ml. water are added in 2–3 portions, by homogenizing the reaction mixture, while cold, during 30 minutes. The mixture is warmed on a paraffine bath up to 115–120° C., in a nitrogen atmosphere, and mixed up from time to time. After three hours the yellow-brown reaction mixture is dissolved in 30 ml. hot distilled water and precipitated at 50–55° C. with 300–400 ml. of ethanol by thoroughly stirring. Two more reprecipitations are carried out by washing each time with 75% ethanol until complete decolorization and removal of last sodium hydroxide remnants. Flocks are mechanically crumbled and filtered on a $G_1$ funnel. The mass in the funnel is then suspended in 200 ml. of 75% ethanolic solution of 0.5 N sulphuric acid, filtered by means of a water-jet pump, washed with 75% ethanol until complete removal of sulphuric acid, dehydrated with ethanol and then with acetone and dried. 7 g. of sulphoethyl-agarose (SE-agarose) are obtained as a white powdery product with a content of about 0.35 mequiv./g. acid groups.

EXAMPLE 2

Example 1 is repeated using, however 10 g. agarose cross-linked by glyceric bridges (agarose X—7.5 of 50–100 mesh) instead of simple agarose. After the three hours of heating the reaction mixture at 115–120° C. in nitrogen atmosphere, gel granules are washed with distilled water on a $G_1$ filter funnel, until decolorization and complete removal of sodium hydroxide. The product is then suspended in 200 ml. of 0.5 N sulphuric acid, filtered, washed with distilled water until complete removal of sulphuric acid, dehydrated with ethanol or/and acetone and dried. 8 g. cross-linked sulphoethyl-agarose (SE-agarose X) are obtained with a content of about 0.3 mequiv./g. acid groups.

In the above mentioned examples, the amounts of sodium bromoethylsulphonate can be varied, thus obtaining some products which differ from each other by their physico-chemical constants and properties. However it should be mentioned that this reagent can be added in a bigger amount only to cross-linked agarose and not to simple agarose because too soluble products are obtained.

Derivatives obtained, according to the present invention, from simple agarose are soluble in hot aqueous solutions. By chilling their solutions gels are obtained which can be converted into granules of any desired size, by means of one of the known literature methods, a form under which these products are used for chromatographic analysis.

Derivatives obtained from cross-linked agarose, according to the present invention are insoluble even in hot aqueous solutions. Their gels are first mechanically crumbled, then dehydrated, dried and selectively passed through a sieve, in order to isolate fractions of desired granulation.

The present invention has the advantage that by introducing sulphoethyl groups into simple or cross-linked agarose molecules, new strong acid ion-exchangers are obtained which permit the analysis of normal and pathological sera, phosphoproteins, plant proteins, some enzyme, etc.

What is claimed is:
1. A product derived from agarose and selected from the group consisting of sulphoethylated agarose and sulphoethylated cross-linked agarose.
2. A product according to claim 1 which is cross-linked sulphoethyl-agarose, cross-links of which consist essentially of glyceric bridges.
3. A process for preparing a strong acid ion exchanger which comprises sulphoethylating a member selected from the group consisting of agarose and cross-linked agarose to obtain a product according to claim 1; the sulphoethylating comprising the steps of admixing the member in alkaline medium with sodium bromoethylsulphonate and heating the resultant for three hours in a nitrogen atmosphere at a temperature within a range from 115° to 120° C.

4. A process according to claim 3 wherein the member is agarose and further comprising dissolving the thus-heated product in hot water, chilling the resultant solution, whereby a gel is formed, and converting the gel into granules.

5. A process according to claim 3 wherein the member is cross-linked agarose, cross-links of which consist essentially of glyceric bridges, and further comprising crumbling, dehydrating, drying and sieving gel at the thus-heated product.

References Cited
UNITED STATES PATENTS
3,189,632   6/1965   Horvath et al. _____ 260—209

LEWIS GOTTS, Primary Examiner
J. R. BROWN, Assistant Examiner

U.S. Cl. X.R.
260—2.2 R